United States Patent Office 2,752,226
Patented June 26, 1956

2,752,226

PRODUCTION OF SODIUM PEROXIDE

Walter Klabunde, Lewiston, and James H. Young, Niagara Falls, N. Y., assignors to E. I. du Pont de Nemours & Company, Wilmington, Del., a corporation of Delaware No Drawing. Application December 21, 1950, Serial No. 202,152

11 Claims. (Cl. 23—184)

This invention relates to the production of sodium peroxide by a method involving the simultaneous reaction of sodium with sodium peroxide and the oxidation of the resulting product to sodium peroxide.

Carveth U. S. Patent 1,685,520 discloses a two-stage method for producing sodium peroxide involving distributing sodium over monoxide particles, oxidizing the distributed sodium with air to form more monoxide which is then oxidized with oxygen in a second stage to the peroxide. The process is not entirely satisfactory in that the product obtained generally contains substantial amounts of objectionable fine or dusty material. Furthermore, the intermediate monoxide particles are difficult to oxidize completely because peroxidation must penetrate to the center of the particle. This requires the application of heat and the use of substantially pure oxygen over a relatively long exposure time.

The reaction of sodium with sodium peroxide to produce sodium monoxide has long been known. This reaction is highly exothermic and it has previously been regarded as too difficult to control and entirely unsuited for use as a source of intermediate monoxide in any commercial process for producing the peroxide.

It has recently been discovered that the reaction of sodium with sodium peroxide to produce the monoxide may be readily and practically controlled by controlling the amount and rate of addition of sodium to an agitated body of particulate peroxide. It has also been discovered that this reaction proceeds at a relatively slow rate at temperatures below about 280° C. but that at about 280° C. and at higher temperatures it proceeds rapidly. The product of the reaction, consisting of particles having a peroxide core and an outer layer of monoxide, oxidizes readily to well integrated sodium peroxide particles without excessive formation of undersized or oversized particles. The method of Young application S. N. 202,151, filed of even date herewith, is based on these discoveries.

It is an object of this invention to provide an improved method of producing sodium peroxide. Another object is to provide a method of producing this product in which sodium is reacted with sodium peroxide under controlled conditions to produce sodium monoxide, which product is simultaneously oxidized to sodium peroxide. A still further object is a method of reacting sodium with sodium peroxide and oxidizing the resulting monoxide simultaneously to sodium peroxide in a system employing the fluidized solids technique. Still other objects will be apparent from the following description.

The above objects are accomplished in accordance with the invention by intimately contacting an agitated body of particulate sodium oxide containing at least 50% $Na_2O_2$ with a gaseous mixture comprising an inert gas containing 0.5% to not more than 4% oxygen while adding metallic sodium to said body at such a rate as will maintain the temperature in said body within the range 280 to 400° C. Under these temperature and atmosphere conditions, the added sodium reacts rapidly with the $Na_2O_2$ of the sodium oxide body and the resulting product is simultaneously oxidized to sodium peroxide.

The reaction of sodium with sodium peroxide is highly exothermic:

A. 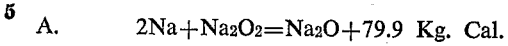  $2Na+Na_2O_2=Na_2O+79.9$ Kg. Cal.

The reaction of the monoxide with oxygen to yield peroxide is also exothermic, but to a lesser degree:

B. 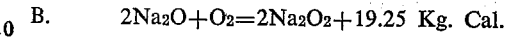  $2Na_2O+O_2=2Na_2O_2+19.25$ Kg. Cal.

While both reactions are exothermic, the process of the present invention may be effectively controlled by controlling the rate at which sodium is added since that rate controls the rate at which monoxide becomes available for reaction B.

Exact operable and preferred numerical limits for the rate of sodium addition cannot be stated with any reasonable accuracy for all possible conditions since such limits will vary widely depending on the operating conditions. Thus, they will depend upon the specific temperature chosen for the operation, the oxygen content of the gas to be used and the rate at which heat is added to or removed from the system. If external heat is added in amounts less than is normally dissipated, the permissible rate of addition will be relatively slow whereas if effective provision is made for withdrawing heat, e. g. by the use of coolers, the permissible rate may be quite rapid. Accordingly, for any chosen set of conditions, the rate of sodium addition should be regulated so as to maintain the temperature desired. While the process is operable at any temperature within 280 to 400° C., operation at a temperature of 280 to 350° C. is preferred. At temperatures above about 350° C. effective agitation becomes more difficult. At temperatures below 280° C., both reactions A and B proceed at an impracticably slow rate. At about 280° C., the reactions, particularly reaction A, proceed at a sharply increased rate.

The sodium may be added as required to the reaction mass in a variety of ways. It may be added in either the solid or molten state, the latter being preferred. Best results are achieved by adding it in the form of droplets or as a spray. If desired, it can also be added as a mixture with sodium oxide. Thus, the sodium can be added to and distributed over the surfaces of particulate sodium monoxide or peroxide, the resulting mixture then being added to the agitated oxide charge in the reactor. Such mixtures can be conveniently prepared by adding the sodium to an agitated body of the oxide particles, employing an amount of sodium not in excess of about 5% of the weight of the oxide. If the oxide to which the sodium is added in this manner is sodium peroxide, or has a $Na_2O_2$ content of at least 50% by weight, the mixture should be prepared under conditions such that reaction between the sodium and the sodium peroxide does not occur to any substantial extent. This can be done by keeping the temperature below 280° C. but above the melting point of sodium, preferably about 200 to 250° C. Also it is preferred in such an operation that the atmosphere be substantially inert, e. g., contain not more than about 0.1% oxygen. However, greater concentrations of oxygen, e. g., up to about 5%, can be tolerated without substantial reaction occurring. With higher oxygen concentrations, oxidation of the sodium tends to proceed at a rate sufficient to hinder effective distribution of the sodium. In preparing such sodium-containing mixtures for use in practicing the present method, it is important that the temperature be maintained below 280° C. regardless whether the material on which the sodium is being distributed is monoxide, peroxide or mixtures thereof.

One way of practicing the present method is to heat an agitated mixture consisting of not more than 5% metallic sodium distributed on particulate sodium oxide containing at least 50% $Na_2O_2$ in an atmosphere containing 0.5% to not more than 4% oxygen at a temperature in the range 280 to 400° C., whereby reactions A and B are caused to occur simultaneously. Sodium may then be distributed over the particles of the final product at a temperature below 280° C. and the cycle repeated. A preferred procedure when using a sodium-sodium oxide mixture as the source of sodium is to form such a mixture in one vessel and add the mixture so formed at the required rate to a second vessel or reactor in which reactions A and B are carried out simultaneously as indicated.

The preferred way of practicing the invention involves effecting distribution of the sodium over the surfaces of an agitated body of particulate sodium oxide containing at least 50% sodium peroxide under such conditions that distribution of the sodium and the reactions indicated by equations A and B all occur simultaneously. This may be done by heating the oxide charge to a temperature in the range 280 to 400° C. and then adding the sodium at such a rate as will maintain the temperature within that range while also maintaining an atmosphere containing 0.5% to not more than 4% oxygen. In this modification, but a single reaction vessel is required and product peroxide may be drawn off at a rate equal to the rate at which peroxide is formed. There should of course be sufficient oxygen supplied to produce a product having the desired $Na_2O_2$ content.

Agitation of the body of oxide particles during any or all stages of a process carried out in accordance with the invention may be effected in any desired manner, e. g., by mechanical agitation such as is provided by a stirrer or by a rotating containing vessel. Agitation by use of the well-known fluidized solids technique has been found to be especially effective and is preferred. In using this technique a confined bed of particulate oxide, e. g., a bed of oxide in a vertical reactor, is fluidized by passing a gas such as nitrogen containing the desired amount of oxygen upwardly through the bed. The rate of flow of the gas through the bed should be sufficient to maintain the solids in the form of a dense turbulent suspension in the gas stream, but insufficient to carry out of the bed any substantial amount of the charge, e. g., not more than about 3.0% per hour. Fluidization in this manner causes the bed to resemble somewhat a body of boiling liquid. Superficial gas velocities on the order of 1.0 to 5.0 and preferably 1.4 to 2.0 feet per second are generally suitable. If distribution of the sodium is carried out as a preliminary operation at below 280° C., fluidization during such distribution will be preferably effected with an inert gas such as nitrogen or nitrogen containing not more than about 0.1% oxygen. On the other hand, during the reaction stage the fluidzing gas should be a mixture of an inert gas such as nitrogen with 0.5% to not more than 4% oxygen and preferably 1 to 2.5%.

Generally, it will be desired to obtain product having a maximum $Na_2O_2$ content and the rate of sodium addition and the oxygen supplied should be correlated for the accomplishment of this object. Commercial sodium peroxide contains a minimum of about 96% $Na_2O_2$ and product of such purity can readily be prepared by the present method. Ordinarily, the product will contain around 97 to 98% $Na_2O_2$. In most operations, not all of the oxygen supplied will be consumed. Thus, when using a fluidized system with a gas feed containing 1.0 to 2.5% oxygen and a temperature of 280 to 350° C., the exit gas usually will contain some oxygen but its oxygen content seldom will exceed about 0.2% unless the sodium is fed intermittently in which case it may at times rise to about 1%.

The term "sodium oxide" is used herein to designate any oxide of sodium, i. e., the monoxide, the peroxide or mixtures thereof. In contrast, the terms "sodium monoxide" and "sodium peroxide" are employed to designate specific oxides of the formulas $Na_2O$ and $Na_2O_2$, respectively.

The invention is further illustrated by the following examples.

Example 1

Liquid sodium was added in a fine stream through a two millimeter capillary tube in about 35 gram increments to a 1000 gram bed of sodium peroxide fluidized in a vertical 70 mm. reactor tube by passing nitrogen containing 0.5% oxygen up through the bed at a superficial velocity of 1.5 to 2 feet per second at the operating temperature of 290 to 360° C. The gas stream entering the bottom of the reactor passed through a distributor and then into the bed. The distributor consisted of a shallow bed of ¼ in. steel balls with an overlying layer of nickel shot. Provision was made for withdrawing product from near the bottom of the reactor and for adding the sodium to the top of the oxide bed. A thermocouple well extending from the bottom through the center of the reactor supported ⅜ in. expanded metal disc baffles spaced 5 in. apart. The flow of gas maintained the oxide bed in the form of a dense turbulent suspension in the gas stream. Distribution of the sodium over the charge, its reaction with the sodium peroxide, and oxidation of the resulting monoxide to peroxide by the oxygen in the fluidizing gas occurred simultaneously. About 20% oxygen over theoretical was put through based on the sodium added. A screen analysis and peroxide test were made of the product after 314 grams of sodium had been added. The following is a comparison of the original and final products:

|  | Original | Final Product |
|---|---|---|
| Percent $Na_2O_2$ test | 97.4 | 95.5 |
| Percent on 20 mesh | 4.6 | 5.0 |
| Percent on 35 mesh | 24.9 | 21.7 |
| Percent on 60 mesh | 41.8 | 51.3 |
| Percent on 80 mesh | 17.2 | 19.7 |
| Percent on 100 mesh | 5.4 | 0.9 |
| Percent on 150 mesh | 4.9 | 0.7 |
| Percent on pan mesh | 1.2 | 0.7 |

Inasmuch as particle size increases when sodium is repeatedly added and reacted in the manner indicated in the above example, it is desirable to supply substantial amounts of fine material periodically or continuously in order that the range of particle size of the product be maintained within the desired limits, e. g., 20 to 100 mesh. Fines for this purpose may be obtained by grinding part of the product and returning it to the reaction charge. The amount of fines added in this manner should be adjusted so as to give product of the desired particle size range. Fines for this purpose may also be obtained by direct burning of sodium to the peroxide. The following example demonstrates how particle size can be controlled.

Example 2

A 2000 g. bed of sodium peroxide was fluidized by a stream of nitrogen containing 2% oxygen with a superficial velocity of 1.4–1.6 feet per second at a bed temperature of 340–350° C. using equipment such as that described in Example 1. Liquid sodium was added to the bed in 6–9 g. increments at a rate which maintained the temperature within the above range. When 200–250 g. of sodium peroxide had been made, a cut of 400–500 g. of material was removed from the bed and at the same time a sufficient amount of ground stock of sodium peroxide was added to the bed to bring the total weight up to 2000 g. Operation in this manner was continued until a total of 1429 g. of sodium had been reacted and 4743 g. of product has been removed in eleven cuts and a total of 2373 g. of the ground stock had been added.

The screen analyses of the first and last cuts are compared below with that of the ground stock.

|  | Ground Stock | Cut #1 | Cut #11 |
|---|---|---|---|
| Percent on 20 mesh | 0.0 | 1.6 | 2.2 |
| Percent on 35 mesh | 3.1 | 14.4 | 17.1 |
| Percent on 60 mesh | 49.8 | 61.2 | 62.1 |
| Percent on 80 mesh | 30.2 | 19.2 | 13.2 |
| Percent on 100 mesh | 10.9 | 2.2 | 4.8 |
| Percent on 150 mesh | 4.7 | 1.1 | 0.6 |
| Percent on pan mesh | 1.3 | 0.1 | 0.0 |

The $Na_2O_2$ content of the original bed stock and product cuts removed was 97.8%, while that of the ground stock was 98.2%.

The use as starting material of sodium oxide of maximum $Na_2O_2$ content is advantageous. Thus, when starting with 100% $Na_2O_2$, the necessity of effecting peroxidation to the center of the particles is avoided since only the outer shell of the particles will require peroxidation. In practice, material containing 100% $Na_2O_2$ will seldom be available but excellent results are obtained with material containing at least 90% $Na_2O_2$, e. g., commercial material which contains a minimum of about 96% $Na_2O_2$. However, the present method can be practiced with advantage over prior methods even when using material containing as low as about 50% $Na_2O_2$.

It is important in practicing the present method to avoid exposure of the sodium oxide particles employed to gas containing more than about 4% oxygen, particularly at temperatures over 280° C. Such exposure causes the particles to become sticky with the result that the effectiveness of agitation is decreased. Furthermore, addition of sodium to particles which have been so exposed results in flash reactions with the formation of large fused low-test agglomerates which do not fluidize satisfactorily. Also, the sodium oxide particles used should not be exposed to moisture, for such exposure also causes the particles to become sticky thereby hindering effective agitation, particularly in fluidized solids systems.

Tht present process gives product which is relatively free from undersized and oversized material. This is desirable for commercial purposes. The method is convenient to operate and does not require pure oxygen or oxygen-enriched air. Furthermore, the application of external heat is not necessary except in starting up operations. In general, the method is well adapted for commercial use and offers distinct advantages and economies over prior methods.

When adding sodium to the oxide charge, it is preferred that it be added directly to the charge, avoiding as much as possible contact of the sodium with equipment surfaces. Such contact decreases agitation effectiveness and, when metal equipment is used, increases product contamination. While the use of a glass reactor is shown in the examples, steel, stainless steel or nickel equipment is most suitable for commercial operations.

We claim:

1. The method of producing sodium peroxide comprising intimately contacting an agitated body of particulate sodium oxide containing at least 50% sodium peroxide with a gas mixture comprising an inert gas and 0.5% to not more than 4% oxygen while adding metallic sodium to said oxide body at such a rate that not to exceed 5% by weight of sodium will be present at any one time and as will maintain said body at a temperature within the range 280 to 400° C., whereby said sodium is reacted with sodium peroxide to produce sodium monoxide and sodium monoxide is simultaneously oxidized to sodium peroxide.

2. The method of claim 1 wherein the temperature is maintained within the range 280 to 350° C.

3. The method of claim 1 wherein the oxygen content of the gas mixture is 1 to 2.5%.

4. The method of claim 1 wherein the sodium is added in the form of a mixture of not more than 5% sodium distributed over the surfaces of a sodium oxide.

5. The method of claim 1 wherein the sodium is added to a body of sodium oxide containing at least 90% sodium peroxide.

6. The method or claim 1 wherein agitation of the body of particulate sodium oxide is effected by passing upwardly through said body a stream of a gas mixture comprising an inert gas and 0.5 to not more than 4% oxygen at a velocity sufficient to maintain said body in the form of a dense turbulent suspension in said stream but insufficient to carry out of said body any substantial amount of said sodium oxide.

7. The method of producing sodium peroxide comprising passing a stream of nitrogen containing 0.5 to not more than 4% oxygen upwardly through a bed of particulate sodium oxide containing at least 50% sodium peroxide at a velocity sufficient to maintain said body of particulate oxide in the form of a dense turbulent suspension in said stream but insufficient to carry out of the bed any substantial amount of oxide particles and adding metallic sodium to said body of oxide at such a rate that not to exceed 5% by weight of sodium will be present at any one time and as will maintain the temperature within said bed within the range 280 to 400° C. and withdrawing product sodium peroxide from said bed at substantially its rate of formation.

8. The method of claim 7 wherein the oxygen content of the nitrogen stream is 1 to 2.5% and the temperature is 280 to 350° C.

9. The method of claim 7 in which the metallic sodium is added to the body of oxide in the solid state.

10. The method of claim 7 in which metallic sodium is added to the body of oxide in the molten state.

11. The method of claim 10 in which the molten sodium is added to the body of oxide in the form of small droplets.

References Cited in the file of this patent

UNITED STATES PATENTS

| 828,759 | Meiser | Aug. 14, 1906 |

FOREIGN PATENTS

| 264,724 | Great Britain | Jan. 27, 1927 |
| 265,124 | Great Britain | Mar. 17, 1927 |
| 549,299 | Great Britain | Nov. 16, 1942 |